C. D. CLARK.
Cooling and Ventilating Grain.
No. 21,245. Patented Aug. 24, 1858.
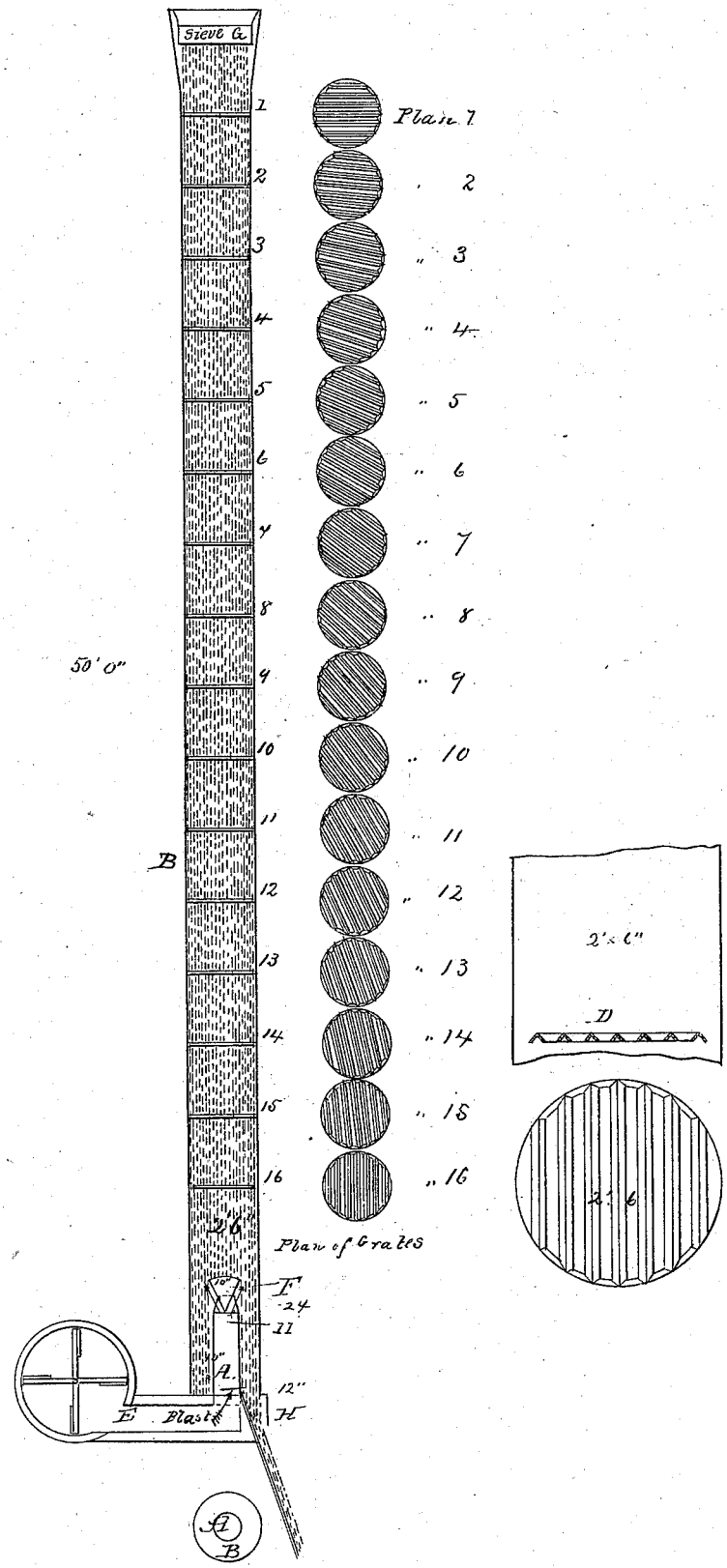

UNITED STATES PATENT OFFICE.

CHARLES D. CLARK, OF CHICAGO, ILLINOIS.

APPARATUS FOR COOLING AND VENTILATING GRAIN.

Specification of Letters Patent No. 21,245, dated August 24, 1858.

*To all whom it may concern:*

Be it known that I, CHARLES D. CLARK, of Chicago, in the county of Cook and State of Illinois, have invented a new and useful Machine for Cooling and Cleansing or Purifying Heated and Impure Cereal Grains, and is called a "Grain Cooler and Purifier;" and I do hereby declare that the following is a full, clear, and exact description of the construction and operation of the same, reference being had to the annexed drawings, making a part of the specification, in which—

A represents the blast pipe; B the cylinder; C the rectangular grates; D the sectional view of the grates; E the blast; F the separating cone.

I construct a blast pipe, as seen at A, which may be of any desired shape and dimensions, over which I place a separating cone, as seen at F. I construct a cylinder, which may be of any required form and dimensions, and which may be placed in a vertical position, or at any inclined angle desired, as seen at B, in which cylinder I place rectangular grates, one above the other, so as to cause the grain to descend in a spiral direction, as seen at C.

The seed or grain falls upon the sieve, as seen at G, and passes through the grates, as seen at Figures 1, 2, 3, 4, &c., until it reaches the discharge pipe, as seen at H. The blast, as seen at E, passes through the blast pipe, as shown by the arrows, passing up through the cylinder B, thereby coming in contact with the seed or grain, while falling from grate to grate, until the blast passes out of the cylinder, carrying off the heated air and other impurities of the seed or grain.

What I claim as my invention, and desire to secure by Letters Patent, is—

The arrangement of cylinder B, provided with rectangular grates, and the blast pipe A, and separating cone F, operating in connection with the blast through the pipe E, substantially as and for the purposes described.

CHARLES D. CLARK. [L. S.]

Witnesses:
  JAS. LEWIS,
  WM. J. WAINWRIGHT.